(12) United States Patent
Longuet et al.

(10) Patent No.: US 10,167,167 B2
(45) Date of Patent: Jan. 1, 2019

(54) DEVICE FOR TOWING A VERY LONG TUBULAR OBJECT

(71) Applicant: THALES, Courbevoie (FR)

(72) Inventors: Jean-Philippe Longuet, Brest (FR); Hervé Le Gras, Roquefort les Pins (FR); Olivier Cosson, Plouarzel (FR); Benoît Peden, Guipavas (FR); Jean Lagadec, Gouesnou (FR)

(73) Assignee: THALES, Courbevoie (FR)

( * ) Notice: Subject to any disclaimer, the term of this patent is extended or adjusted under 35 U.S.C. 154(b) by 234 days.

(21) Appl. No.: 15/321,687

(22) PCT Filed: Jul. 6, 2015

(86) PCT No.: PCT/EP2015/065327
§ 371 (c)(1),
(2) Date: Dec. 22, 2016

(87) PCT Pub. No.: WO2016/001444
PCT Pub. Date: Jan. 7, 2016

(65) Prior Publication Data
US 2018/0208273 A1    Jul. 26, 2018

(30) Foreign Application Priority Data
Jul. 4, 2014   (FR) ...................................... 14 01504

(51) Int. Cl.
*B65H 51/14*    (2006.01)
*H02G 1/10*     (2006.01)

(52) U.S. Cl.
CPC ............... *B65H 51/14* (2013.01); *H02G 1/10* (2013.01)

(58) Field of Classification Search
CPC ........... B65H 51/14; B65H 51/18; H02G 1/10
See application file for complete search history.

(56) References Cited

U.S. PATENT DOCUMENTS 4,899,823 A    2/1990   Cobb et al.
5,839,636 A    11/1998  Fleischmann

FOREIGN PATENT DOCUMENTS

| FR | 2 858 309 A1 | 2/2005 |
| GB | 2 293 156 A  | 3/1996 |
| WO | 00/17481     | 3/2000 |

*Primary Examiner* — William E Dondero
(74) *Attorney, Agent, or Firm* — Baker & Hostetler LLP

(57) ABSTRACT

A device for towing very long tubular objects comprises a casing and an assembly which can be fixed removably to the casing. The removable assembly comprises: pulling means capable of driving in their movement, by friction, the object in a towing direction, gripping means capable of exerting a load on the pulling means to keep the pulling means and the towed object in continuous contact; the gripping means being driven by a relative movement relative to the towed object in a direction opposite to the towing direction. The casing comprises driving means, connected removably to the pulling means and gripping means and configured to drive in movement the pulling means and the gripping means in a coordinated manner to ensure a continuous and uniform pulling of the object.

14 Claims, 5 Drawing Sheets

DEVICE FOR TOWING A VERY LONG TUBULAR OBJECT

CROSS-REFERENCE TO RELATED APPLICATIONS

This application is a National Stage of International patent application PCT/EP2015/065327, filed on Jul. 6, 2015, which claims priority to foreign French patent application No. FR 1401504, filed on Jul. 4, 2014, the disclosures of which are incorporated by reference in their entirety.

FIELD OF THE INVENTION

The present invention relates to a device for towing very long elongate objects. This device notably makes it possible to put to sea or else raise and stow under deck a very long tubular object of relatively flexible and brittle structure. Such objects that can notably be cited are submarine cables, pipes or even linear sonar antennas of "flute" type.

BACKGROUND

The handling of substantially tubular and very long objects is a difficult operation, particularly when the object handled has a flexible and brittle structure comprising, for example, a succession of relatively brittle objects placed in a more flexible tubular sheath, or even when the object exhibits irregularities of diameter over its length. The problem arises in particular in the case of the sonar systems, which surface vessels or submarine vessels are equipped with. The effectiveness of the detection of these systems is greatly dependent on the length of the antenna, and very long tubular antennas, for example of flute type, are generally used. As is known, such linear antennas have a length of several hundred meters for a diameter of the order of a few centimeters. In a mission, the antenna has to be put to sea, deployed to a sufficient length, then raised back on board the vessel at the end of the mission. This operation is difficult, both in the case of a surface vessel, likely to be exposed to a choppy sea, and in the case of a submarine vessel for which the antenna and the towing device are submerged.

Various towing devices have attempted to resolve these difficulties. There is known, for example from the patent published under the reference U.S. Pat. No. 5,839,636, a device of caterpillar type ensuring the towing of the antenna by means of two tracks facing one another and in contact with the antenna to be displaced. Also known from the applicant is the towing device described in the patent application published under the reference FR 2858309. The principle of this known device is recalled hereinbelow by means of FIG. 1. The general idea of the device is to decouple the loads exerted on the object to be towed by separating means continuously ensuring the gripping of the object and means ensuring the pulling of the object.

As illustrated in FIG. 1, such a towing device comprises a frame 11 supporting the following two means:

Pulling means, mainly consisting of two treads 12 arranged on either side of and along the object to be towed 10. Each tread 12 is wound around two pulleys 13 and 14 fixed onto uprights situated at each of the ends of the main frame.

Gripping means, consisting of a first flange 15 and of a second flange 16, in the form of disks, linked to one another by uprights 19. The flanges 15 and 16 are mounted to be rotationally mobile about the longitudinal axis of the device referenced X, by means of holding parts 17 and 18 via bearings for example. The assembly forms a frame 114 that is rotationally mobile relative to the frame 11. The central parts of the flanges 15 and 16 and of the holding parts 17 and 18 are holed, so as to be able to be passed through by the object 10 to be towed and the treads 12.

The gripping means ensure the contact between the treads 12 and the object to be towed 10 by means of a belt 110 helically wound around the object to be towed and portions of the treads in contact with the object. The winding is sufficiently tight to keep the object and the treads in close contact. The ends of the belt are connected together to form a straight strand 111 which runs in the grooves of the opposing pulleys 112 and 113, fixed respectively onto each of the flanges 15 and 16. The function of these pulleys 112, 113 is notably to ensure the tension of the belts fixed respectively to each of the flanges 15, 16. The assembly consisting of the flanges 15 and 16 and of the uprights 19 forms a frame 114 that is rotationally mobile about the longitudinal axis of the device.

To perform the towing of the object 10, the device also comprises means setting the pulling and gripping means in motion. These means comprise a main shaft 115 and a system of gears and of gearboxes 116 to which secondary shafts are coupled making it possible to rotate the pulleys 14 which ensure the driving of the treads 12, and the pulley 16 which drives the frame 114 in rotation. In the exemplary embodiment, the pulley 16 is coupled via a belt 122 to another pulley 121 secured to the shaft 115.

To ensure the displacement of the object 10 in the direction indicated by the arrow 118, the shaft 115 is actuated by means of a flywheel 117 so that the rotation of the pulleys 14 drives the displacement of the treads 12 in the direction indicated by the arrows 119. The displacement of the treads drives an identical displacement of the object 10. At the same time, the rotation of the shaft 115 rotates the frame 114 in the direction indicated by the arrow 120. This rotation drives the winding of the belts 110 on the side of the flange 15 and a simultaneous unwinding on the side of the flange 16. The effect of this dual action is to provoke a relative displacement of the gripping means along the object 10, in a direction opposite to the real displacement of the object 10 and of the treads 12. Thus, the object 10 is able to progress linearly while being kept closely in contact with the treads. The displacement movement of the object is similar to the linear and continuous displacement of the free jaws of a vice along the worm screw which is used to tighten it, when the vice is tightened or untightened. Conversely, since the operation of the device is symmetrical by construction, the displacement of the object 10 in the opposite direction will be able to be ensured by maneuvering the shaft 115 in the opposite direction by means of the flywheel 117. For the towing action to be effectively feasible, the rotational movement of the frame drives a relative displacement substantially equal to the displacement imparted on the object by the rotation of the treads 12. The coordination of the two movements can be ensured by mechanical means, for example a gearbox device mounted on the shaft 115.

This device presents many advantages compared to the prior devices, for example of caterpillar type. In particular, the separation of the gripping and pulling functions into two means makes it possible to decouple the two loads exerted on the object, making it possible to exert an effective pulling force, without having to exert an excessive, and even damaging pressure on the object to be towed. Difficulties have however been observed that the present invention seeks to resolve.

The belt of the gripping means is a key component of the towing device. During the towing, the belt is wound and unwound by means of the mobile frame and of the pulleys rotating about the object to be towed. To ensure the gripping of the object, the belt is also stressed in tension continuously. The belt, generally made of elastomer material, is exposed to the aggressivity of the marine environment, particularly in the case of a submerged towing device. For these reasons, a rapid aging of the belt has been observed. The replacement of the belt is complex and requires difficult intervention on the device.

The invention aims to mitigate these difficulties encountered by the towing devices of the prior art, by proposing a device that notably allows for increased reliability and enhanced repairability.

SUMMARY OF THE INVENTION

To this end, the subject of the invention is a device for towing of very long tubular shape, comprising a casing and an assembly which can be fixed removably to the casing. The removable assembly comprises:
  pulling means capable of driving in their movement, by friction, the object in a towing direction,
  gripping means capable of exerting a load on the pulling means to keep the pulling means and the towed object in continuous contact, the gripping means being driven by a relative movement relative to the towed object in a direction opposite to the towing direction,
  and in that the casing comprises driving means, connected removably to the pulling means and gripping means and configured to drive in movement the pulling means and the gripping means in a coordinated manner to ensure a continuous and uniform pulling of the object.

Advantageously, the pulling means and the gripping means can be coupled to the driving means by a single translational movement of the removable assembly with respect to the casing in a plane at right angles to the towing direction.

Advantageously:
  the pulling means comprise a pulley guiding a tread coming into contact with the object to be towed, produced in a material with strong adhesive power; the tread being able to be driven in movement by rotation of the pulley,
  the driving means comprise an actuator and a synchronization mechanism; the synchronization mechanism comprises a shaft configured to drive the pulley of the pulling means in rotation.

Advantageously, the gripping means comprise:
  a frame that is rotationally mobile about the pulling axis of the object, formed by a first and a second flange linked by longitudinal uprights and passed through by the object to be towed and the tread;
  a first and a second main pulley fixed respectively onto the first and second flanges,
  a belt taut between the first and second main pulleys and helically wound around the object to be towed and the tread, so as to exert a load on the tread and keep the tread in contact on the object to be towed,
  a toothed wheel that can drive the mobile frame in rotation by winding and unwinding the belt respectively on the side of the first and of the second flange;

the synchronization mechanism comprising a pinion configured to drive the toothed wheel.

Advantageously, the gripping means comprise two toothed wheels secured respectively to the first and the second flanges; the synchronization mechanism comprising two pinions configured to drive each of the two toothed wheels.

Advantageously, the pulley and the shaft are coupled removably by means of a dog clutch device allowing for a simultaneous coupling of the pulling means of the toothed wheels with the pinions, and of the pulley with the shaft, by translation of the removable assembly with respect to the casing in a plane at right angles to the towing direction Advantageously, the removable assembly comprises setting means, capable of adjusting the load exerted on the pulling means.

Advantageously, the setting means comprise a return pulley that can be displaced relative to the two main pulleys, so as to adjust a tension exerted on the belt, making it possible to adjust the load exerted by the tread on the object to be towed. The casing comprises a second actuator which can be connected removably to the setting means and configured to allow the return pulley to be displaced with respect to the two main pulleys.

Advantageously, the device comprises several belts and several first and second main pulleys fixed respectively onto the first and the second flanges; each belt being associated with a first and a second main pulley, taut between said first and second main pulleys, and helically wound around the object to be towed and the tread.

Advantageously, the pulling means comprise at least one tread having a circular arc form, so as to match the shape of the object to be towed over a portion of its circumference.

Advantageously, the pulling means comprise a spring mechanism configured to tighten the tread so as to adapt to a variation of diameter of the object to be towed.

Advantageously, the pulling means comprise several treads coming into contact with the object to be towed, produced in a material with strong adhesive power, distributed angularly around the object to be towed.

Advantageously, the device comprises a brake capable of slowing down the gripping means or the pulling means.

Advantageously, the device comprises means for measuring the movement of the object towed.

BRIEF DESCRIPTION OF THE DRAWINGS

The invention will be better understood and other advantages will become apparent on reading the detailed description of embodiments given by way of example in the following figures.

In the interests of clarity, the same elements will bear the same references in the different figures.

DETAILED DESCRIPTION

The present invention relates to improvements to the towing device described in the preamble of this application with reference to the patent application FR 2858309. The towing device according to the invention comprises a certain number of components in common with this prior art device. Hereinbelow, the structural or functional definition of the components in common with the prior art device is not systematically repeated, but is deduced directly from the description of this known device. The device according to the invention is of particular use for towing a very long linear antenna, which the sonar systems that are for example embarked on submarines are equipped with. Obviously, this particular application is not limited to the invention which more broadly covers a device suitable for handling substantially tubular and very long objects. The device can be implemented in various fields. The device can be fully submerged in a marine environment in the particular case of a submarine application, or exposed to the ambient air and to the weather in the case of a stationary device on land or even in the case of an antenna pulled from a surface vessel.

In order to limit or slow down the wear of the gripping means, the invention relates firstly to a device comprising means making it possible to adjust the load exerted by the gripping means on the object pulling means.

Figure 2:
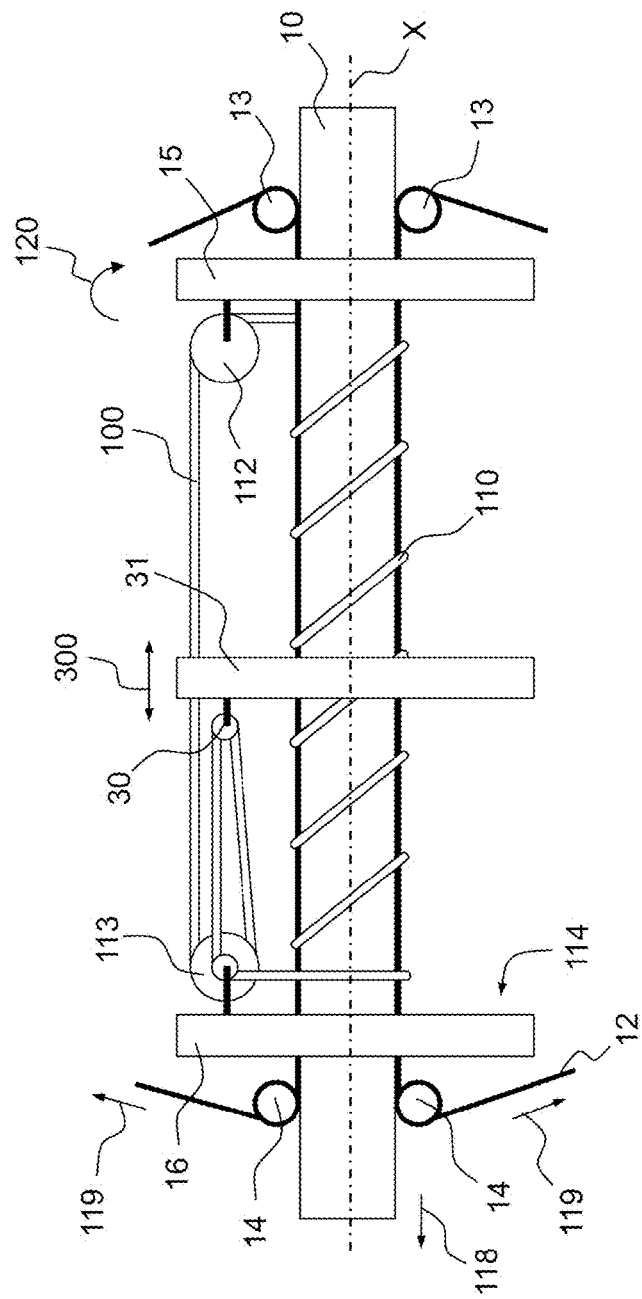
FIG. 2 illustrates the principle of a towing device comprising means for setting the load exerted by the gripping means on the pulling means.

FIG. 2 illustrates the principle of a towing device comprising setting means, or setting subassembly for making it possible to adjust, during the towing of the object, the load exerted on the pulling means. As previously, the towing device comprises:

pulling means, or tractor or pulling subassembly, capable of driving, by friction, the object 10 in a towing direction 118,
  gripping means, or gripper or gripping subassembly, capable of exerting a load on the pulling means to keep the pulling means and the towed object continuously in contact; the gripping means being driven in a relative motion in relation to the towed object in a direction opposite to the towing direction,
  driving means, or driving device, capable of driving the pulling means and the gripping means in a coordinated manner to ensure a continuous and uniform pulling of the object.

In a preferred embodiment, the pulling means comprise at least one tread 12 coming into contact with the object to be towed, and produced in a material with strong adhesive power. The tread 12 is taut between two pulleys 13 and 14 and driven in motion by the driving means (not represented). The adhesion of the tread makes it possible to drive the object to be towed 10 in its movement, by friction. The pulling means and the object to be towed are kept continuously in contact at least over a section of the object. The surface of the tread 12 coming into contact with the surface of the object 10 is preferably rough in order to ensure a better pulling adhesion.

A towing device is envisaged in which the pulling means comprise a single tread, or preferentially a plurality of treads. A device is notably envisaged that comprises two treads arranged facing one another and on either side of the object to be towed, as represented in FIG. 2. A towing device is also envisaged that comprises more than two treads, for example three or four treads, distributed angularly, in star fashion, around the object to be towed.

In a preferred embodiment, the gripping means comprise at least one belt 110 taut between two pulleys 112 and 113, called main pulleys, and helically wound around the object to be towed 10 and the tread 12. The belt 100 forms a straight strand 100 which runs in the grooves of the opposing pulleys 112 and 113. If the pulling means comprise several treads 12, the belt is helically wound around the object 10 and each of the treads. Configured thus, the tension of the belt 110 exerts a load on the tread or treads, making it possible to keep the pulling means and the object to be towed in continuous contact.

Advantageously, the belt is produced in an elastic material. Advantageously, the belt is elastically taut. The belt 110 is advantageously elastically taut between the two main pulleys 112, 113 and helically wound around the object to be towed so as to exert the load on the tread to keep the tread continuously in contact on the object to be towed. Advantageously, the belt 110 is elastically taut over its entire length. Thus, the belt automatically adapts to a change of diameter of the object to be towed. The adaptation of the diameter of the cable does not require the provision of any dedicated return device.

The gripping means comprise a frame 114 that is rotationally mobile about the pulling axis X of the object. The mobile frame 114 is in the form of two flanges 15 and 16 linked by longitudinal uprights 19 and passed through by the object to be towed and the tread or treads 12. A first main pulley 112 is fixed onto a first flange 15. A second main pulley 113 is fixed onto a second flange 16.

Figure 1:
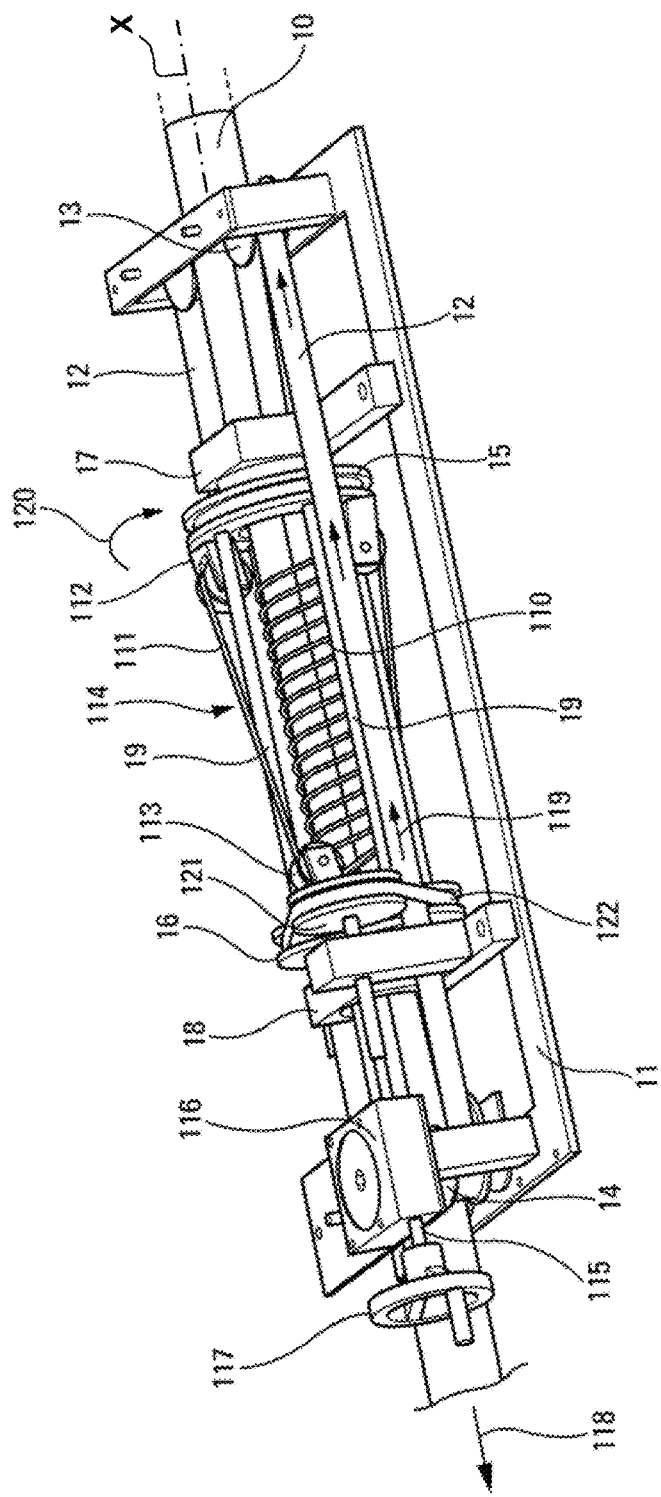
FIG. 1, already presented, represents a device for towing an object according to the known art, comprising pulling means and gripping means.

According to a principle similar to that described in the preamble with regard to FIG. 1, the decoupling of the pulling function—produced by means of the treads 12, and of the gripping function—produced by means of the belt 110 helically wound around the treads, is obtained by driving the two means in a coordinated manner. The driving means (not represented in FIG. 2) ensure, on the one hand, the displacement of the tread 12, for example by driving one of the pulleys 13 or 14 in rotation; the adhesion of the tread driving the displacement of the object to be towed in its movement, by friction. The driving means also ensure the winding and the unwinding of the belt 110 by driving the frame 114 in rotation. The object 10 is then driven in translation along the axis X, while being kept closely in contact with the treads.

The driving means are configured to ensure a coordinated driving of the pulling means and of the gripping means. For example, the driving means comprise an actuator, such as an electric motor, a heat engine or a hydraulic motor, and a synchronization mechanism capable of converting a rotational movement generated by the actuator into two coordinated movements making it possible to drive the pulling means, for example by driving the pulley 14 in rotation, and the gripping means, for example by driving the mobile frame 114 in rotation. The driving means can comprise a gearbox device mounted on a main shaft driven by a rotary actuator, comprising, for example, a gear and gearbox system 116 to which are coupled two secondary shafts making it possible to rotate the pulleys 14 which ensure the driving of the treads 12, and the pulley 16 which drives the frame 114 in rotation. Other forms of driving means can also be envisaged without departing from the scope of the invention. For example, the pulling and gripping means can be driven by independent dedicated actuators and a control device ensuring the synchronization between the two actuators.

Gripping means comprising several belts are also envisaged. The belts are advantageously helically wound around the object to be towed and in an entangled manner along the towing direction. Each of the belts can be taut between two main pulleys linked respectively to the first and second flanges 15 and 16. Each belt ensures that the pulling means are held on the object to be towed. The rotation of the mobile frame drives the winding and the unwinding of each of the belts simultaneously. The mounting of each of the belts is then advantageously similar and identical to that which will be described hereinbelow, notably with regard to the mounting of the belt with the main pulleys and the return pulley.

The device according to the invention therefore comprises two distinct means or subassemblies for ensuring the pulling and gripping functions. The pulling means are driven by a translational movement along the axis of the object whereas the gripping means are driven by a rotational movement about the same axis. The separation of the means has the advantage of ensuring the decoupling of the loads exerted on the object to be towed. That makes it possible to set the force driving the object to be towed by acting on two independent parameters, namely the tread driving torque and the tension of the belt.

These two means exerting distinct functions cooperate to ensure a continuous pulling of the object to be towed and a good distribution of the stresses over its surface. The device as a whole has a fixed position.

According to an aspect of the invention, the towing device also comprises setting means configured to be able to adjust the load exerted on the pulling means. In the example represented in FIG. 2, the setting means comprise a return pulley 30, on which the belt 110 is mounted. The return pulley 30 can be displaced relative to the two main pulleys 112 and 113, so as to adjust the tension of the belt 110, making it possible to adjust the load exerted by the tread on the object to be towed.

Preferentially, the main pulleys 112, 113 are fixed in translation along the longitudinal axis X of the object to be towed relative to the frame which is rotationally mobile about the axis of the object to be towed. In other words, the main pulleys are not translationally mobile along the longitudinal axis of the object to be towed 10 relative to the frame 114. The main pulleys 112, 113 are the first pulleys encountered by the belt 110 at either end of its winding around the object to be towed 10, that is to say on leaving its winding around the object to be towed at either end of said winding. The return pulley 30 is encountered after the main pulleys on leaving the winding. The return pulley 30 is translationally mobile relative to the main pulleys 112, 113 along the longitudinal axis of the object to be towed 10.

Consequently, when the return pulley is translated along the longitudinal axis relative to the main pulleys, the pitch of the helix, the angle of the helix formed by the belt 110, and the length of the helix along the longitudinal axis of the object to be towed remain unchanged. That makes it possible to well control the load exerted on the object to be towed by the pulling means (and notably by the tread(s) 12) because it depends only on the tension of the belt and on limiting the risks of flexing of the object to be towed, by virtue of the tension of the pulling means. Moreover, because of retention of the helix pitch and angle formed by the belt 110, the risk of overlapping of the turns of the helix in the translation of the return pulley is limited which limits the risks of jamming of the object to be towed. Now, once the object is jammed because of the overlapping of the turns, it is necessary to dismantle and remount the belt to be able to once again use the towing device.

Preferentially, the setting means comprise a mobile flange 31, passed through by the object to be towed 10 and the tread or treads 12, mounted between the two flanges 15 and 16. The return pulley 30 is fixed onto the mobile flange 31. The mobile flange 31 can be displaced in translation along the axis X, as represented by the arrow 300, between the first and the second flanges 15 and 16, so as to adjust the tension of the belt 110. For that, the mobile flange 31 comprises openings passed through by the longitudinal uprights 19.

The openings of the mobile flange can be configured so as to ensure the translational guiding of the flange relative to the longitudinal uprights.

The mounting of the belt 110 represented in FIG. 2 is similar to that of tackle generally implemented to reduce the load necessary to bring two sets of pulleys closer together. In this case, the tackle-mounting of the belt by means of a return pulley, otherwise known as tackle block, that can be displaced relative to two fixed pulleys, advantageously makes it possible to modify the tension of the belt. In the example represented in FIG. 2, the belt is taut between a pulley 112, a return pulley 30 and a double pulley 113 with two different diameters. The tackle-mounting can implement double pulleys of distinct diameters, as represented in FIG. 2, or double pulleys of the same diameters, as represented in the subsequent figures. Various types of mounting of the belt around the main pulleys and the return pulleys are possible without departing from the scope of the invention.

In a preferred implementation, the setting means are configured to make it possible to displace the return pulley between a first and a second position, determined so as to exert, on the object to be towed, a load lying between a minimum value close to zero and a predetermined maximum value. In the first position, the belt is very weakly taut around the object to be towed. The device is in a so-called disengaged position. The tension of the belt could have been zero in the first position. Advantageously, a low tension is retained in this position so as to avoid having the belt escape from the pulleys. In the first position, the tension of the belt is such that the towing device does not make it possible to tow the object to be towed. In other words, the minimum value of the load exerted on the object to be towed, by the belt 110 and the tread(s) 12, does not make it possible to tow the object to be towed by the displacement of the tread(s). The friction load is insufficient to ensure the towing. In the so-called engaged second position, a maximum tension is imposed on the belt. The load exerted by the belt on the tread or treads is maximal. This load makes it possible to tow the object to be towed. Advantageously, the value of the minimum load lies between 5 Newtons and 100 Newtons.

The towing device thus provided with the setting means advantageously makes it possible to adapt the tension exerted on the belt. The setting can be carried out during the towing, both to increase or reduce the tension of the belt and therefore the towing load. The towing device can be configured to make it possible to disengage the object to be towed, by exerting a gripping load close to zero on the object.

The setting means advantageously make it possible to limit the aging of the belt, generally made of elastomer material. Contrary to the prior art devices, it becomes possible to adapt the tension of the belt at each instant according to the needs of the mission. In practice, it becomes possible to impose a tension on the belt only during a towing operation. For an application to a sonar system, the tension of the belt can be relaxed as soon as the deployment or the removal of the antenna is completed.

Obviously, the benefits of the prior art device are retained. The towing device according to the invention thus makes it possible to ensure a continuous towing movement, avoiding having the towed object undergo jerks that could damage it. The movement is also reversible and can be used to put the object into the water or remove it. The device according to the invention can also advantageously be adapted to towing an object whose section is not constant or even objects made up of rigid portions and more flexible portions. It can finally operate automatically and thus offers the advantage of limiting the need for human intervention in sometimes fairly perilous conditions.

Figure 3A:
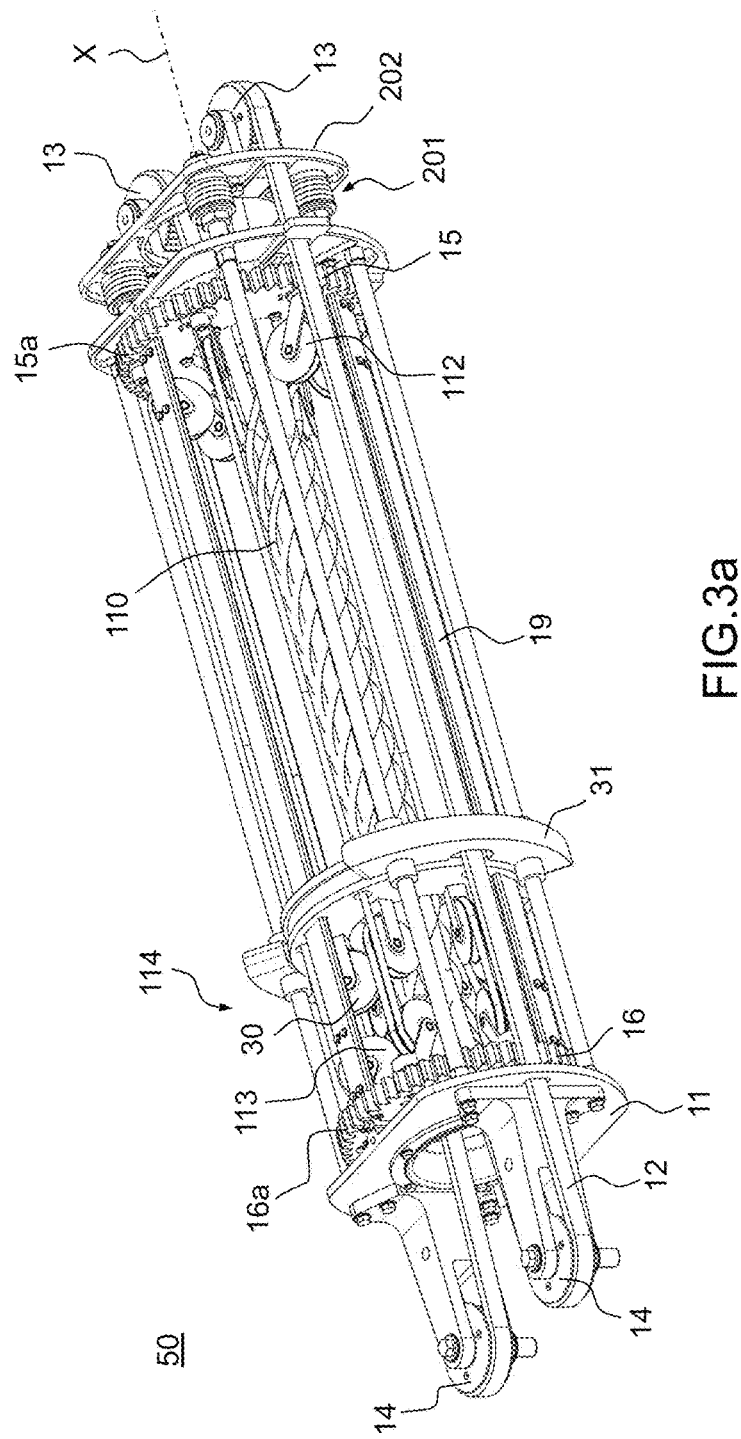
FIGS. 3a and 3b represent a first example of a towing device comprising means for setting the gripping load, respectively in a disengaged configuration and an engaged configuration.
Figure 3B:
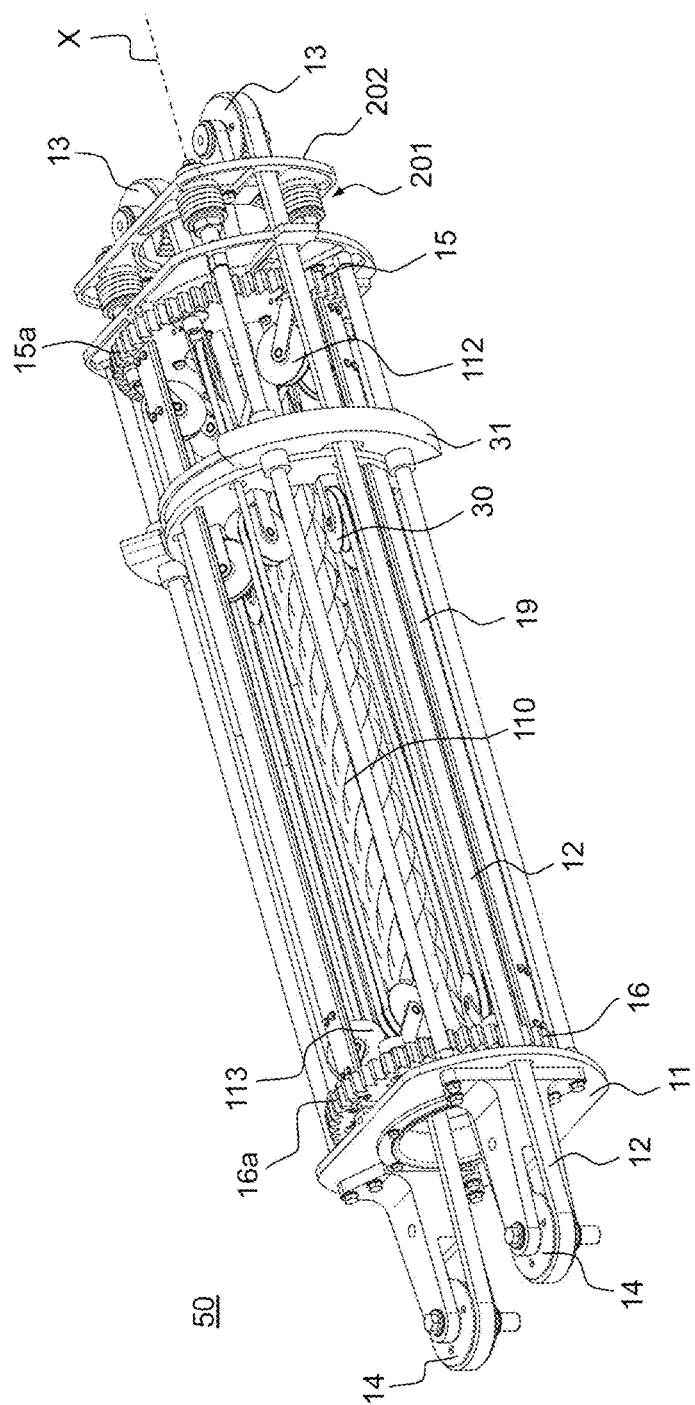

FIGS. 3a and 3b represent a first example of a towing device comprising adjustable gripping means, respectively in a disengaged configuration and an engaged configuration.

This example of towing device 50 applies the principle described above by means of FIG. 2. Thus, the device 50 comprises:

pulling means capable of driving the object to be towed by friction, gripping means capable of exerting a load on the pulling means keeping the pulling means and the towed object in contact, driving means, capable of driving the pulling means and the gripping means in a coordinated manner.

The pulling means comprise two treads 12 with strong adhesive power, taut between two pulleys 13 and 14 that can be driven in rotation by the driving means (not represented). The gripping means comprise a mobile frame 114 formed by two flanges 15 and 16 linked by longitudinal uprights 19. The flanges 15 and 16 are in the form of a holed disk, and are passed through by the object to be towed (not represented) and the two treads. The gripping means also comprise a belt 110 helically wound, between the flanges 15 and 16, around the object to be towed and the two treads. The frame 114 is rotationally mobile about the pulling axis X. It can be driven by the driving means via two toothed wheels 15a and 16a mounted at the periphery of the two flanges 15 and 16.

The device 50 also comprises setting means capable of adjusting, during the towing of the object, the load exerted on the pulling means. As previously, the setting means comprise a return pulley 30 fixed onto a flange 31 that is translationally mobile between the two flanges 15 and 16. In FIG. 3a, the mobile flange 31 is in a first position imposing a low tension on the belt, the load exerted between the treads and the object to be towed is close to zero as has been described previously. The device is in disengaged configuration. In FIG. 3b, the mobile flange 31 is in a second position imposing a high tension on the belt, the loading exerted between the treads and the object to be towed is maximal. The device is in an engaged configuration.

The invention envisages switching over between the two positions by means of a dedicated actuator, such as, for example, an electric or hydraulic linear actuator, capable of displacing the mobile flange. Implementing a disengaging mechanism linked to the displacement of the object to be towed is also envisaged. Thus, the setting means can be configured so that a relief on the surface of the object to be towed, such as, for example, an end-of-travel stop mechanically drives, by the displacement of the towed object, the displacement of the return pulley to its disengaged position, so as to substantially neutralize the load exerted by the tread on the object.

Note also that the device 50 represented in FIGS. 3a and 3b is distinguished from the devices already described by the architecture of the gripping means and of the setting means. In particular, the gripping means comprise several main pulleys 112 and 113 on each of the flanges 15 and 16. In the example represented, the belt 110 is taut between six pulleys 112 fixed onto the flange 15 and six pulleys 113 fixed onto the flange 16. The belt is helically wound around the object to be towed and the treads in six successive passes. This type of mounting with several entangled helixes advantageously makes it possible to balance the tension exerted on the belt and to angularly distribute the load exerted on the treads. It allows for a greater variation of the tension of the belt, that is to say of the length of the belt.

The setting means also comprise several return pulleys 30 fixed onto the mobile flange 31. In the example represented, six return pulleys are fixed onto the mobile flange 31, and cooperate with the six single 112 and double 113 main pulleys of the flanges 15 and 16. The translational displacement of the mobile flange 31 makes it possible to adjust the tension of the belt 110 in a balanced manner. The load exerted on the treads is angularly distributed uniformly.

The invention also envisages implementing pulling means comprising one or more treads 12 having a circular arc form, so as to closely follow the form of the object to be towed over a portion of its circumference.

According to another aspect of the invention, the device can advantageously comprise means for adjusting the tension of the treads wound between the pulleys 13 and 14. As represented in FIGS. 3a and 3b, the pulleys 13 are fixed onto a flange 202 that can slide along the longitudinal axis X relative to the frame 11. The flange 202 is linked to the frame 11 via a set of springs 201 tending to separate the pulleys 13 and the frame 114 from one another, so as to strain the tread 12 in tension. In other words, the pulling means are provided with a spring mechanism 201 configured to tauten the tread or treads. This configuration advantageously makes it possible to adapt to variations of diameter of the object to be towed.

The difficulties encountered by the prior art devices in performing maintenance operations on the towing device were indicated in the preamble to the present application. In particular, the periodic replacement of the elastomer belt of the gripping means is an operation that is difficult to perform. The invention therefore seeks to facilitate maintenance or repair interventions on the device.

Figure 4:
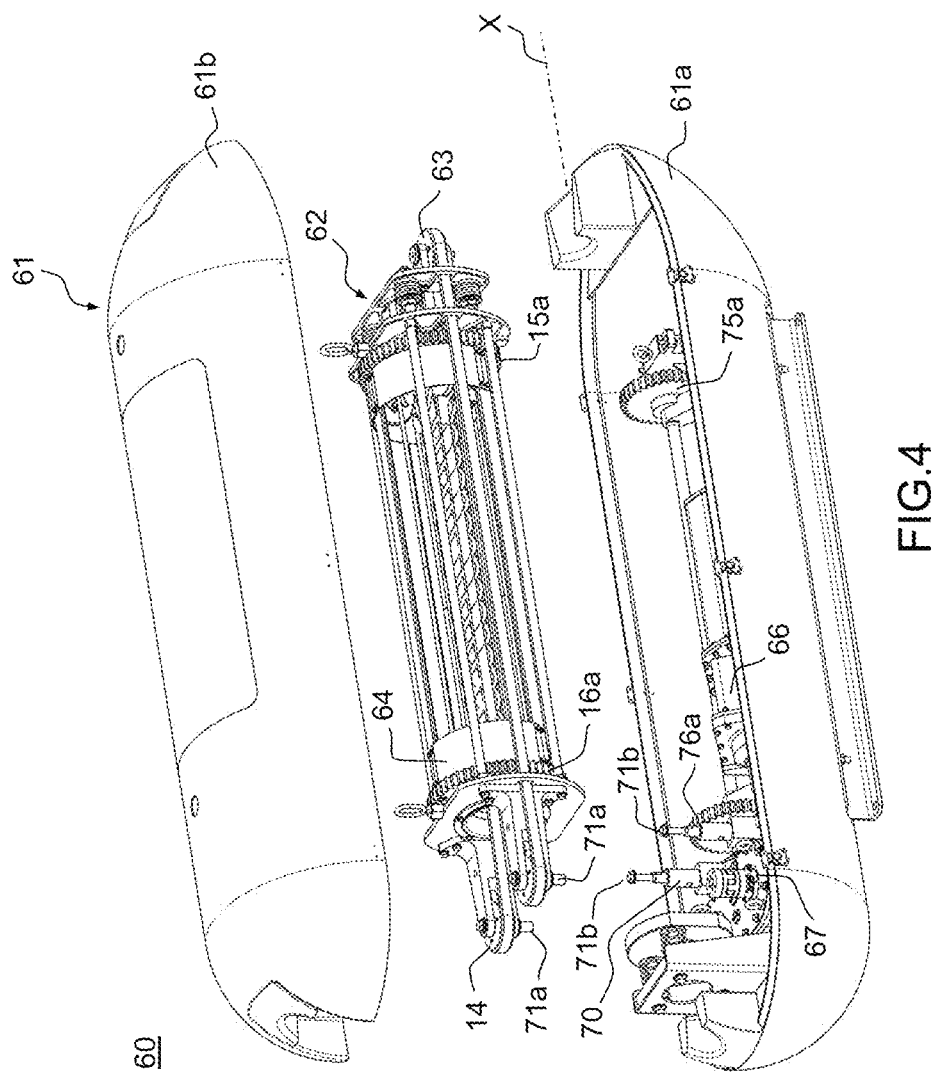
FIG. 4 represents, by exploded view, a second example of a towing device comprising several modular subassemblies.

FIG. 4 represents, in an exploded view, a second example of a towing device comprising several modular subassemblies. In this second example, the device 60 comprises a casing 61 intended to be mounted for example on a marine vessel, and a removable assembly 62. The removable assembly similar to the device described previously by FIGS. 3a and 3b. It notably comprises pulling means 63 and gripping means 64. It can also comprise means for setting the load exerted on the pulling means. It is however clearly understood that the principle of a modular towing device, allowing for improved repairability, is also applicable in the absence of these setting means.

The embodiments previously described for the pulling 63, gripping 64 or setting means are envisaged for this second exemplary device. The detailed definition thereof is not repeated systematically hereinbelow.

As represented in FIG. 4, the casing 61 comprises a bottom part 61a and a top part 61b that are removable, between which the removable assembly 62 can be mounted. The casing 61 further comprises an actuator 66, such as a heat engine, an electric motor or a hydraulic motor, and a synchronization mechanism 67 driven by the actuator 66.

The synchronization mechanism 67 is removably linked to the pulling 63 and gripping 64 means. The synchronization mechanism 67 is configured to drive the movement of the pulling means 63 and the gripping means 64 in a coordinated manner to ensure a continuous and uniform pulling of the object.

The pulling means comprise at least one pulley 14 and one tread 12 coming into contact with the object to be towed and that can be driven in movement by rotation of the pulley 14. The synchronization mechanism 67 comprises a shaft 70, configured to rotationally drive the pulley 14 of the pulling means. The pulley 14 and the shaft 70 can be coupled removably by means of two dog clutches 71a and 71b, secured respectively to the pulley 14 and the shaft 70. The two dog clutches form a coupling subassembly or a coupling device. Other coupling means or coupling subassemblies are also envisaged, in particular a friction coupling. In FIG. 4, the pulling means comprise two treads driven by means of two pulleys. The synchronization means logically comprise two shafts 70 capable of driving the two treads, and coupled with the two pulleys 14 removably by means of two dog clutch devices.

As previously described, the gripping means comprise a frame that is rotationally mobile about the pulling axis of the object, formed by a first and a second flange 15 and 16 linked by longitudinal uprights and passed through by the object to be towed and the tread. Each of the first and second flanges 15 and 16 comprise a toothed wheel, respectively referenced 15a and 16a, mounted at the periphery of each of the flanges. The rotation of the toothed wheels rotationally drives the mobile frame, by winding and unwinding the belt respectively on the side of the first and of the second flange. The synchronization mechanism 67 comprises a first pinion 75a and a second pinion 76a configured to cooperate respectively with the first and the second toothed wheels 15a and 16a so as to rotationally drive the mobile frame. Ensuring the rotational driving of the mobile frame by means of a single pinion and toothed wheel assembly is also envisaged. Moreover, the toothed wheel or wheels can be mounted at the periphery of the flanges, or more generally be secured to the mobile frame.

In the case where the removable assembly 62 comprises means for setting the load exerted on the pulling means, by displacement of a return pulley relative to the two main pulleys, the casing can advantageously comprise a second actuator, for example a linear or hydraulic actuator, removably linked to the setting means and configured to make it possible to displace the return pulley.

This configuration of a removable towing device is particularly advantageous. In case of failure of the pulling or gripping means, or in a periodic maintenance operation, the removable assembly 62 can be separated from the casing, and transported to a workshop to facilitate the intervention of an operator. The removable assembly can also be replaced by a second assembly to ensure a continuity of mission during maintenance on the removable assembly. The structural elements and the more reliable components (motor, synchronization mechanism) remain permanently fixed to the vessel.

Advantageously, the pulling means and the gripping means of the removable assembly can be linked to the driving means by a single translational movement of the removable assembly relative to the casing in a plane at right angles to the towing direction. By positioning the towing direction of the device on a horizontal axis, the removable assembly can be mounted in and dismantled from the casing by a vertical displacement in a plane parallel to the plane of the toothed wheels, simultaneously coupling the toothed wheels with the pinions, and the pulley with the shaft by virtue of the dog clutch device of vertical axis. In addition, the device can advantageously be provided with lifting means or a lifting device configured to make it possible to displace the removable assembly relative to the casing in a maintenance operation.

The present invention also envisages providing the towing device with a brake capable of slowing down the gripping means or the pulling means. The brake can be configured to act at the output of the motor or on the rotationally mobile frame.

To improve the capacity to drive the towing device, it is also envisaged to implement measurement means comprising at least one sensor making it possible to measure the movement of the towed object, for example a sensor of displacement or a sensor of speed of the towed object.

The invention claimed is:

1. A device for towing very long tubular objects comprising a casing and an assembly which can be fixed removably to the casing; wherein the removable assembly comprises:
    pulling means capable of driving in their movement, by friction, the object in a towing direction,
    gripping means capable of exerting a load on the pulling means to keep the pulling means and the towed object in continuous contact; the gripping means being driven by a relative movement relative to the towed object in a direction opposite to the towing direction,
    and wherein the casing comprises driving means, connected removably to the pulling means and gripping means and configured to drive in movement the pulling means and the gripping means in a coordinated manner to ensure a continuous and uniform pulling of the object.

2. The towing device as claimed in claim 1, wherein the pulling means and the gripping means can be coupled to the driving means by a single translational movement of the removable assembly relative to the casing in a plane at right angles to the towing direction.

3. The towing device as claimed in claim 2, wherein:
    the pulling means comprise a pulley guiding a tread coming into contact with the object to be towed, produced in a material with strong adhesive power; the tread being able to be driven in movement by rotation of the pulley,
    the driving means comprise an actuator and a synchronization mechanism; the synchronization mechanism comprises a shaft configured to rotationally drive the pulley of the pulling means.

4. The towing device as claimed in claim 3, wherein the gripping means comprise:
    a frame that is rotationally mobile about the pulling axis of the object, formed by a first and a second flange linked by longitudinal uprights and passed through by the object to be towed and the tread;
    a first and a second main pulley fixed respectively onto the first and the second flanges,
    a belt taut between the first and second main pulleys and helically wound around the object to be towed and the tread, so as to exert a load on the tread and keep the tread in contact on the object to be towed,
    a toothed wheel that can drive the mobile frame in rotation by winding and unwinding the belt respectively on the side of the first and of the second flange,
    and wherein the synchronization mechanism comprises a pinion configured to drive the toothed wheel.

5. The towing device as claimed in claim 4, wherein the gripping means comprise two toothed wheels secured respectively to the first and to the second flanges; the synchronization mechanism comprising two pinions configured to drive each of the two toothed wheels.

6. The towing device as claimed in claim 5, wherein the pulley and the shaft are coupled removably by means of a dog clutch device, allowing for a simultaneous coupling of the pulling means of the toothed wheels with the pinions and of the pulley with the shaft by translation of the removable assembly relative to the casing in a plane at right angles to the towing direction.

7. The towing device as claimed in claim 4, wherein the removable assembly comprises setting means, capable of adjusting the load exerted on the pulling means.

8. The towing device as claimed in claim 7, wherein the setting means comprise a return pulley that can be displaced relative to the two main pulleys, so as to adjust a tension exerted on the belt, making it possible to adjust the load exerted by the tread on the object to be towed;

and wherein the casing comprises a second actuator which can be connected removably to the setting means and configured to allow the return pulley to be displaced with respect to the two main pulleys.

9. The device as claimed in claim 3, wherein the gripping means comprise several belts and several first and second main pulleys fixed respectively onto the first and the second flanges; each belt being associated with a first and a second main pulley and taut between said first and second main pulleys and helically wound around the object to be towed and the tread.

10. The device as claimed in claim 3, wherein the pulling means comprise a spring mechanism configured to tighten the tread so as to adapt to a variation of diameter of the object to be towed.

11. The device as claimed in claim 1, wherein the pulling means comprise at least one tread having the shape of a circular arc, so as to match the shape of the object to be towed over a portion of its circumference.

12. The device as claimed in claim 1, wherein the pulling means comprise several treads coming into contact with the object to be towed, produced in a material with strong adhesive power, distributed angularly around the object to be towed.

13. The device as claimed in claim 1, comprising a brake capable of slowing down the gripping means or the pulling means.

14. The device as claimed in claim 1, comprising means for measuring the movement of the towed object.

* * * * *